(12) United States Patent
Stauffer

(10) Patent No.: US 6,507,477 B1
(45) Date of Patent: Jan. 14, 2003

(54) ELECTRICAL CAPACITOR

(76) Inventor: John E. Stauffer, 6 Pecksland Rd., Greenwich, CT (US) 06831

( * ) Notice: Subject to any disclaimer, the term of this patent is extended or adjusted under 35 U.S.C. 154(b) by 0 days.

(21) Appl. No.: 09/658,965

(22) Filed: Sep. 11, 2000

(51) Int. Cl.$^7$ .......................... H01G 4/008; C04B 35/46
(52) U.S. Cl. ...................... 361/305; 361/286; 361/433; 361/306; 501/138
(58) Field of Search ................................. 361/305, 286, 361/433, 301.1, 302, 306.1, 311, 306, 321; 427/49; 438/329; 501/138

(56) References Cited

U.S. PATENT DOCUMENTS

| | | | |
|---|---|---|---|
| 3,609,482 A | | 9/1971 | Edelman et al. |
| 3,654,533 A | * | 4/1972 | della Porta et al. ......... 317/258 |
| 3,923,676 A | | 12/1975 | Räsänen |
| 3,935,333 A | * | 1/1976 | Muneoka et al. ............ 427/49 |
| 3,975,304 A | * | 8/1976 | della Porta et al. ......... 252/463 |
| 4,041,359 A | | 8/1977 | Mizushima et al. |
| 4,338,354 A | | 7/1982 | Bush et al. |
| 4,338,506 A | * | 7/1982 | Geller et al. ................. 219/121 |
| 4,399,199 A | * | 8/1983 | McGill et al. .............. 428/633 |
| 4,511,601 A | | 4/1985 | Akse et al. |
| 4,520,422 A | * | 5/1985 | Borland ...................... 361/305 |
| 4,605,989 A | | 8/1986 | Marse et al. |
| 4,726,991 A | * | 2/1988 | Hyatt et al. ................. 428/329 |
| 4,743,364 A | * | 5/1988 | Kyrazis ....................... 209/212 |
| 5,028,346 A | | 7/1991 | Dulin |
| 5,177,662 A | * | 1/1993 | Thoma ........................ 361/286 |
| 5,478,632 A | | 12/1995 | Kurz et al. |
| RE35,420 E | | 1/1997 | Cathey et al. |
| 5,948,536 A | | 9/1999 | Suzuki et al. |
| 5,990,029 A | | 11/1999 | Satoh et al. |

* cited by examiner

Primary Examiner—Dean A. Reichard
Assistant Examiner—Nguyen Ha
(74) Attorney, Agent, or Firm—Young & Basile

(57) ABSTRACT

An electrical capacitor is discloses which includes a mixture of electrically conductive and non-conductive particles. The particles are intimately mixed so as to provide a random distribution, and the mixture is placed between two parallel conductive plates to which electrical leads are attached and pressure is applied.

12 Claims, 1 Drawing Sheet

ELECTRICAL CAPACITOR

FIELD OF THE INVENTION

A new type of capacitor has been developed for use in electric and electronic circuits. The capacitor comprises an intimate mixture of electrically conductive particles and non-conductive particles spaced between two conductive plates kept nearly equally separated. The random nature of the mixture promotes the formation of a network of conductive particles that provide an extended surface area.

STATE OF THE ART

All capacitors, sometimes known as condensers, are based on the principle that an electric charge on one conductor will induce a charge of opposite polarity on another conductor which is separated from the first by insulating material. In practice, the conductors usually consist of two parallel plates that may be flat or spirally wound. These plates are separated from each other by a thin layer of insulating material known as a dielectric. Such an arrangement has the ability to store electric charge and electric energy. The properties of these devices also render them extremely useful in every conceivable electronic application.

The ability of a capacitor to store an electric charge depends on several characteristics. The capacitance is defined as the ratio of the charge on one conductor divided by the applied voltage. This capacitance has been determined to be proportional to the area of the plates and inversely proportional to the distance between the plates. The proportionality constant is known as the dielectric constant, which depends on the properties of the insulating material.

In attempts to increase capacitance, the electrolytic capacitor was developed. In this device a plate, often made of tantalum, is coated with an oxide layer that acts as a dielectric. The coated plate is immersed in a solution which functions as the complementary plate. Various modifications of the electrolytic capacitor have succeeded in increasing its performance significantly. This type of capacitor, however, is limited to use with direct current.

Efforts continue to enhance the performance of capacitors. Newer applications, such as electronics used in space exploration, require devices of minimum size, capable of operating at higher temperatures. Therefore, it is an object of the present invention to provide for an improved capacitor design, one that offers the maximum capacitance in the smallest possible size. This and other objects, features and advantages of the invention will be apparent from the accompany drawing and the following description.

SUMMARY OF THE INVENTION

Figure 1:
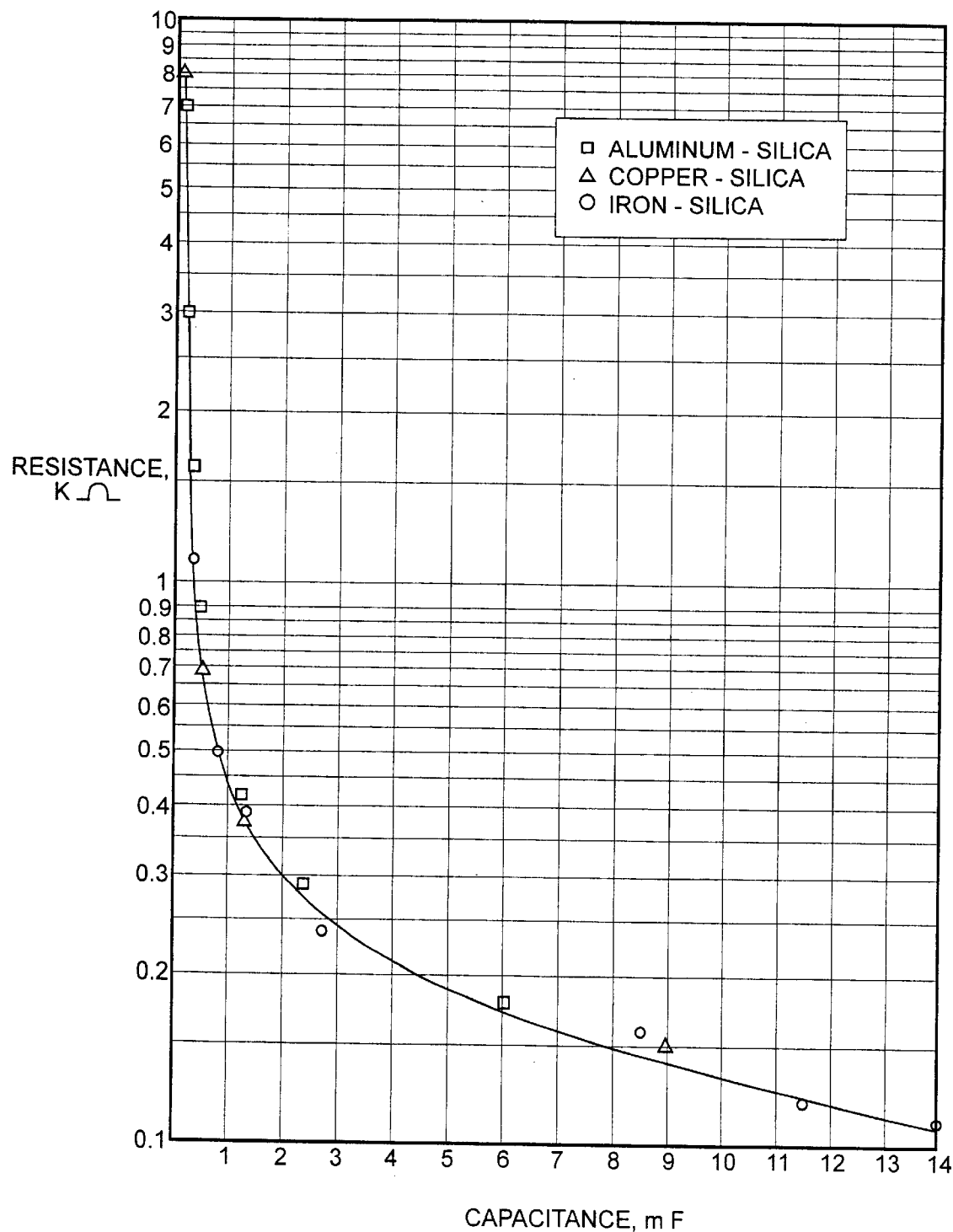
FIG. 1 is a graph of capacitance as a function of resistance for a capacitor comprising a random mixture of electrically conductive and non-conductive particles of −100 mesh. Three metals were used for the conductive particles: aluminum, copper, and iron. The composition of the non-conductive particles was silicon dioxide.

In a preferred embodiment, the present invention discloses an electrical capacitor comprising a random mixture of electrically conductive particles and non-conductive particles. This mixture is spaced between two parallel conductive plates to which electrical leads are attached. The electrically conductive particles may be formed from any number of metals including aluminum, copper, and iron. Other conductors such as tantalum, titanium and zirconium may also be used. The non-conductive particles are made of such dielectric materials as plastic, ceramics and glass.

The size of the particles may vary over a wide range. Typically these particles may run from 100 mesh or coarser all the way down to 1 micron. These sizes, however, are not meant to be limiting. Colloidal particles, for example, may be used in this application.

The proportion of conductive to non-conductive particles may vary extensively. The practical limits must be determined experimentally, but in theory anywhere from 100 percent conductive particles to zero percent may be employed. The geometry of the capacitor will be a factor in determining the proportion.

DETAILED DESCRIPTION OF THE PREFERRED EMBODIMENT

The rationale for using small particles of an electrically conductive material in a capacitor is that large surface areas can be achieved by this means. This effect can be visualized by slicing a block in three directions at right angles. As the thickness of the slices is reduced, the surface area of the resulting particles is increased. The total area of all particles will be inversely proportional to the length of an edge raised to the third power. If spherical particles are produced, the total area is inversely proportional to their diameter cubed.

A second advantage of using small particles is that the distance between particles is reduced as their diameter decreases. Mathematically this relationship can be expressed by saying the distance between particles is proportional to their diameter.

When the above relationships for area and distance are substituted into the basic equation for capacitance, the following expression is obtained:

$$C = \frac{K}{D^4}$$

Where C is capacitance, K is a proportionality constant and D is the diameter of the particles. This expression is noteworthy because it shows that the capacitance is inversely proportional to the fourth power of the diameter.

In designing a capacitor, a number of practical considerations must be faced. The particles of conductive material and non-conductive material must be intimately mixed so as to provide a random composition. In this manner, strands or clumps of conductive particles are formed. These agglomerations will form a conductive network between the plates of the capacitor.

Obtaining a random mixture of conductive and non-conductive particles is not necessarily simple. Ideally both types of particles should be identical in size, shape, and density. Even then considerable agitation is required to obtain perfect mixing. Spherical particles are preferred because they provide the greatest free surface area.

Experimental work quickly confirms another obstacle. Because of the very large number of particles present, the total contact resistance becomes significantly large. Aluminum particles, for example, are covered with an oxide layer that offers electrical resistance. In their aggregate, these particles contribute substantial resistance.

In order to minimize contact resistance, several alternatives are available. Less reactive metals can be used that do not oxidize or tarnish so easily. The metal particles can be coated with a noble metal such as platinum or gold. Finally, pressure can be applied to the mixture of particles by a piston or other suitable device.

The non-conductive particles can be made of a number of materials including plastic, ceramics, and glass. Certain of these materials have been shown to have high dielectric constants. Barium titanate is notable in this respect. Capacitance can be enhanced by using such dielectrics.

Unfortunately there is no such thing as an ideal capacitor. The present invention is no exception. As FIG. 1 illustrates, an unavoidable amount of leakage resistance occurs under conditions that lead to significant levels of capacitance. These preliminary data, nevertheless, are encouraging because of the substantial values of capacitance realized.

Applications for the present invention are hard to pinpoint without further experimental work. In spite of this difficulty, the promise of exceptionally high capacitances should recommend this invention to numerous uses. Capacitors of the present invention also have the ability to operate with both direct current and alternating current. The relative simplicity of design is an added benefit.

EXAMPLE 1

A cell was fabricated from 1/8 inch acrylic sheet. This cell had inside dimensions of 3/4 inch wide by 3/4 inch long by 2 inches high. A top was made from the same sheet so that it could fit within the cell and slide freely up and down. The cell was lined on two opposite sides with aluminum foil that was cut out of a soft drink can.

A mixture of two volumes of aluminum powder −100 mesh and one volume of silicon dioxide −100 mesh was placed in the cell to a height of 1 1/16 inch. The top was inserted over the powder. Pressure was applied to the powder by means of a C-clamp.

Initially there were no readings of capacitance on a digital multimeter which was connected to the aluminum foil linings. As pressure was applied, however, readings were obtained for capacitance and resistance. The measurements of capacitance were made at a test frequency of 21 Hz and test voltage of less than 3.5v. The results are shown in FIG. 1.

EXAMPLE 2

The same apparatus was used as employed in Example 1. This time a 50—50 percent mixture by volume of iron powder −100 mesh and silicon dioxide powder −100 mesh was tested. The height of the mixture in the cell was 1 1/8 inch. The results are shown in FIG. 1.

EXAMPLE 3

Again, the same apparatus was used as in the previous examples. A 50—50 percent mixture by volume of copper powder −100 mesh and silicon dioxide powder −100 mesh was placed in the cell to a height of 15/16 inch. The data for this mixture are shown in FIG. 1.

What is claimed is:

1. An electrical capacitor comprising a random mixture of electrically conductive particles arid non-conductive particles, said mixture being spaced between two parallel conductive plates to which electrical leads are attached; wherein the electrically conductive particles and non conductive particles are substantially uniform in size and substantially spherical in shape, said capacitor being characterized by the expression $C=K/D^4$ where C is capacitance, K is the proportionality constant and D is the diameter of the particles.

2. A capacitor according to claim 1 where the conductive particles are made from zirconium.

3. A capacitor according to claim 2 where the zirconium particles are coated with platinum.

4. A capacitor according to claim 1 where the non-conductive particles are made of barium titanate.

5. The electrical capacitor of claim 1 wherein the conductive particles are sized from about 1 micron to about 100 microns.

6. The electrical capacitor of claim 1 wherein the material for the conductive particle is selected from the group consisting of aluminum, iron, copper, zirconium, titanium, tantalum, and mixtures thereof.

7. The electrical capacitor of claim 1 wherein the electrically conductive particles are coated with a material selected from the group consisting of gold, platinum, and mixtures thereof.

8. The electrical capacitor of claim 1 wherein the material for the non-conductive particles are selected from the group consisting of plastics, ceramics, glass, and mixtures thereof.

9. The electrical capacitor of claim 8 wherein the ceramic material is barium titanate.

10. The electrical capacitor of claim 8 wherein the ceramic material is silicon dioxide.

11. The capacitor according to claim 1 wherein the conductive particles comprises between about 50% and about 67% by volume of the particles in the mixture.

12. An electrical capacitor comprising:

a pair of conductive plates in electrical isolation from one another; and a mixture of electrically conductive and non conductive particles disposed between the plates, said mixture held between the plates under pressure, wherein the electrically conductive particles and non conductive particles are substantially uniform in size and substantially spherical in shape wherein the electrically conductive particles and non conductive particles are substantially uniform in size and substantially spherical in shape, said capacitor being characterized by the expression $C=K/D^4$ where C is capacitance, K is the proportionality constant and D is the diameter of the particles.

* * * * *